United States Patent [19]

Puzzo

[11] Patent Number: 5,255,000
[45] Date of Patent: Oct. 19, 1993

[54] TRANSMISSION SIGNAL DIRECTION FINDING APPARATUS AND METHOD

[76] Inventor: Dean C. Puzzo, 1 Rainier Ct., Merrimack, N.H. 03054

[21] Appl. No.: 792,991

[22] Filed: Nov. 15, 1991

[51] Int. Cl.$^5$ .............................................. G01S 5/04
[52] U.S. Cl. .................................. 342/442; 342/437; 342/432
[58] Field of Search ...................... 342/432, 437, 442

[56] References Cited

U.S. PATENT DOCUMENTS

| | | | |
|---|---|---|---|
| 4,633,516 | 12/1986 | Tsui | 342/442 |
| 4,675,684 | 6/1987 | Spence | 342/442 X |
| 4,975,710 | 12/1990 | Baghdady | 342/442 |

Primary Examiner—Mark Hellner
Attorney, Agent, or Firm—David W. Gomes

[57] ABSTRACT

An apparatus and method for measuring the angles of arrival of a pair of transmission signals relative to a fixed antenna pair simultaneously receiving the transmission signals based upon the phase difference between antennas for each signal and the frequencies thereof includes components for separately squaring the signals received by each antenna, filtering each squared signal for separating a high frequency band and a middle frequency band, first phase correlating high frequency band signals filtered from each squared signal for producing a sum signal of the phase differences between the antennas for received transmission signals, second phase correlating middle frequency band signals filtered from each squared signal for producing a difference signal for the phase differences of the transmission signals received by the antenna pair, determining the phase differences of the transmission signals received by the antenna pair from the sum and difference signals therefor, providing delayed middle frequency band signals filtered from a squared signal from one of the antennas, third phase correlating the delayed middle frequency band signals from the one of the antennas with the middle frequency band signals of the other of the antennas for producing a correspondence signal related to the correspondence between the frequencies and the determined phase differences, and computing the angles of arrival of the pair of transmission signals using the determined phase differences, the frequencies and the correspondence signal.

18 Claims, 2 Drawing Sheets

TRANSMISSION SIGNAL DIRECTION FINDING APPARATUS AND METHOD

BACKGROUND OF THE INVENTION

Cross Reference

This application is related to the co-pending application by Dean C Puzzo entitled "Instantaneous Frequency Measurement Apparatus and Method" filed on even date herewith.

Field of the Invention

This invention generally relates to direction finding for transmission signals and particularly to such apparatuses and methods which are capable of operation when more than one signal is simultaneously received.

Statement of the Prior Art

There are several techniques by which the angle of arrival (AOA) or direction of arrival (DOA) of a received transmission signal can be measured. These include sequential lobing, conical scanning, amplitude monopulse and phase-monopulse. Each of these techniques has its own respective strengths and weaknesses; however, a considerable weakness common to all techniques is the inability to make valid measurements when there is more than one signal present during the observation period. This condition includes multiple simultaneous signals due to multiple sources or due to a single source with multipath effects.

SUMMARY OF THE INVENTION

Accordingly, the present invention provides an apparatus for measuring the angles of arrival of a pair of transmission signals relative to a fixed antenna pair simultaneously receiving the transmission signals based upon the phase difference between antennas for each signal and the frequencies thereof, comprising means for separately squaring the signals received by each antenna; means for filtering each squared signal for separating a high frequency band and a middle frequency band; first means for phase correlating high frequency band signals filtered from each squared signal for producing a sum signal of the phase differences between the antennas for received transmission signals; second means for phase correlating middle frequency band signals filtered from each squared signal for producing a difference signal for the phase differences of the transmission signals received by the antenna pair; means for determining the phase differences of the transmission signals received by the antenna pair from the sum and difference signals therefor; means for providing a delayed middle frequency band of signals filtered from a squared signal from one of the antennas; third means for phase correlating the delayed middle frequency band signals from the one of the antennas with the middle frequency band signals of the other of the antennas from the means for filtering each squared signal for producing a correspondence signal related to the correspondence between the frequencies and the determined phase differences; and means for computing the angles of arrival of the pair of transmission signals using the phase differences from the means for determining, the frequencies of the transmission signals and the correspondence signal from the third means for phase correlating.

The present invention also provides a method for measuring the angles of arrival of a pair of transmission signals relative to a fixed antenna pair simultaneously receiving the transmission signals based upon the phase difference between antennas for each signal and the frequencies thereof, comprising: separately squaring the signals received by each antenna; filtering each squared signal for separating a high frequency band and a middle frequency band; first phase correlating high frequency band signals filtered from each squared signal for producing a sum signal of the phase differences between the antennas for received transmission signals; second phase correlating middle frequency band signals filtered from each squared signal for producing a difference signal for the phase differences of the transmission signals received by the antenna pair; determining the phase differences of the transmission signals received by the antenna pair from the sum and difference signals therefor; providing delayed middle frequency band signals filtered from a squared signals from one of the antennas; third phase correlating the delayed middle frequency band signals from the one of the antennas with the middle frequency band signals of the other of the antenna for producing a correspondence signal related to the correspondence between the frequencies and the determined phase differences; and computing the angles of arrival of the pair of transmission signals using the determined phase differences, the frequencies and the correspondence signal.

BRIEF DESCRIPTION OF THE DRAWINGS

The present invention is illustratively described below in reference to the accompanying drawings in which.

DETAILED DESCRIPTION OF THE DRAWINGS

One method commonly used to measure the direction of arrival of a target or signal is based on measuring the phase difference between two separated receiving antennas. Specifically, the phase of a signal received by a reference antenna and that from another antenna displaced by some known distance, are subtracted to yield information that is directly related to the angle that the incident wavefront makes with a line joining the two antennas.

Figure 1:
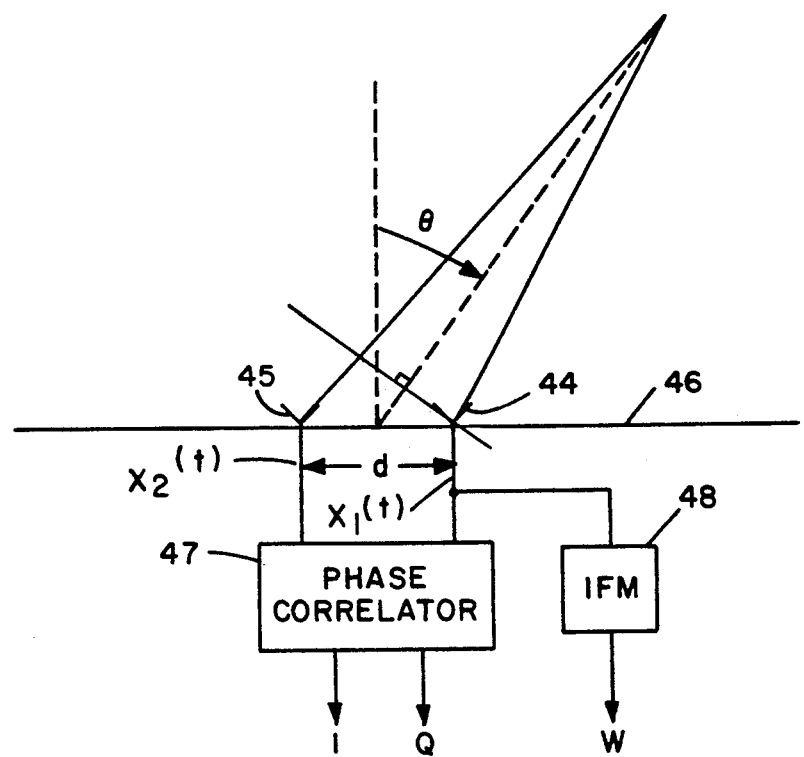
FIG. 1 is a general block diagram of an apparatus constructed in accordance with prior art.

FIG. 1 shows two antennas 44,45 spaced by a distance d with outputs $x_1(t)$ and $x_2(t)$. The target or source will result in a signal at frequency $w_o$ ($2\pi f$) and amplitude A of the form $$A\cos(w_o t + \phi_o) \quad (1)$$

where $\phi_o$ is an arbitrary phase constant.

The output of the reference antenna can be described by $$x_1(t) = A\cos(w_o t + \phi_1) \quad (2a)$$

and the output of the second antenna can be described by $$x_2(t) = A\cos(w_o t + \phi_2) \quad (2b)$$

What makes the information contained in $x_1(t)$ and $x_2(t)$ useful in terms of angle of arrival is the mathematical relationship between $\phi_1$ and $\phi_2$ for $d << R$, the source distance 43, or $$\Delta\phi = \phi_2 - \phi_1 = \frac{2\pi d}{\lambda_0}\sin(\theta) = w_o \frac{d}{c}\sin(\theta) \quad (3)$$

where c is the speed of light in free-space and $\theta$ is the angle of arrival relative to boresite, which is normal to the line 46 between the two antennas. Note that if one were to measure this phase difference, $\Delta\phi$, as well as the frequency, $w_o$, the angle of arrival, $\theta$, would be solvable.

What is typically done is to measure the phase difference using a microwave phase correlator 47. If the frequency is not known, it is usually measured simultaneously with the phase measurement using an IFM (instantaneous frequency measurement) device 48.

Microwave phase correlators typically operate over octave or even multi-octave bandwidths and produce video output voltages proportional to the Sine and/or Cosine of the relative phase between two input signals. We can describe the output of the correlator with inputs described by equations (2a) and (2b) using $$I = A'\cos(\phi_2 - \phi_1) = A'\cos(\Delta\phi) \quad (4a)$$

$$Q = A'\sin(\phi_2 - \phi_1) = A'\sin(\Delta\phi) \quad (4b)$$

where $A'$ is proportional to the power input $|A|^2$. To extract $\Delta\phi$, one simply takes the ARCTAN of the real value $Q/I$. From equation (3) we can solve for the angle of arrival, $\theta$, in terms of I and Q from the output of the phase correlator to yield $$\theta = \frac{c}{w_o d} \text{ARCTAN}(Q/I) \quad (5)$$

Note that where the I and Q values are proportional to the original signal amplitude, the ratio $Q/I$ is independent of the signal amplitude $A'$.

The problem arises when there is more than one signal present at the antennas during the computation of angle of arrival or equivalently when the values of I and Q are sampled. When two signals are present, the signals at the output of the two antennas of FIG. 1 can be written using superposition as $$x_1(t) = A_1\cos(w_1 t + \phi_{11}) + A_2\cos(w_2 t + \phi_{12}) \quad (6a)$$

$$x_2(t) = A_1\cos(w_1 t + \phi_{21}) + A_2\cos(w_2 t + \phi_{22}) \quad (6b)$$

where $w_1$ and $w_2$ are the frequencies of signals one and two, respectively, and $A_1$ and $A_2$ are the amplitudes of signal one and two, respectively. The relationships between the phase terms in equation (6) can be described by $$\Delta\phi_1 = \phi_{12} - \phi_{11} = w_1 \frac{d}{c}\sin(\theta_1) \quad (7a)$$

$$\Delta\phi_2 = \phi_{22} - \phi_{21} = w_2 \frac{d}{c}\sin(\theta_2) \quad (7b)$$

where $\Theta_1$ and $\Theta_2$ are the angles of arrival of signal one and two respectively. Again using superposition, and the transfer function of the microwave phase correlator described by equation (4), the expected I and Q values due to two simultaneous signals are $$I = A_1'\cos(\Delta\phi_1) + A_2'\cos(\Delta\phi_2) \quad (8a)$$

$$Q = A_1'\sin(\Delta\phi_1) + A_2'\sin(\Delta\phi_2) \quad (8b)$$

Substituting equation (8) into equation (5) yields $$\theta = \frac{c}{w d} \text{ARCTAN} \frac{[A_1'\sin(\Delta\phi_1) + A_2'\sin(\Delta\phi_2)]}{[A_1'\cos(\Delta\phi_1) + A_2'\cos(\Delta\phi_2)]} \quad (9)$$

which, upon inspection, yields an incorrect angle measurement on both $\theta_1$ and $\theta_2$. Note that as one signal amplitude is allowed to drop below the other signal amplitude, equation (9) approaches that of a single angle estimate as in equation (5), yielding the angle of arrival of the stronger signal. It will be assumed for the purpose of this document that as long as the second signal power is more than (6) dB lower than the first, a good estimate of the higher power signal's angle of arrival will result when using the single frequency calculation. It is worth pointing out that if an IFM is used to measure $w(2\,f)$, and two signals are present whose relative powers are within (6) dB, the IFM output will also be in error.

Figure 2:
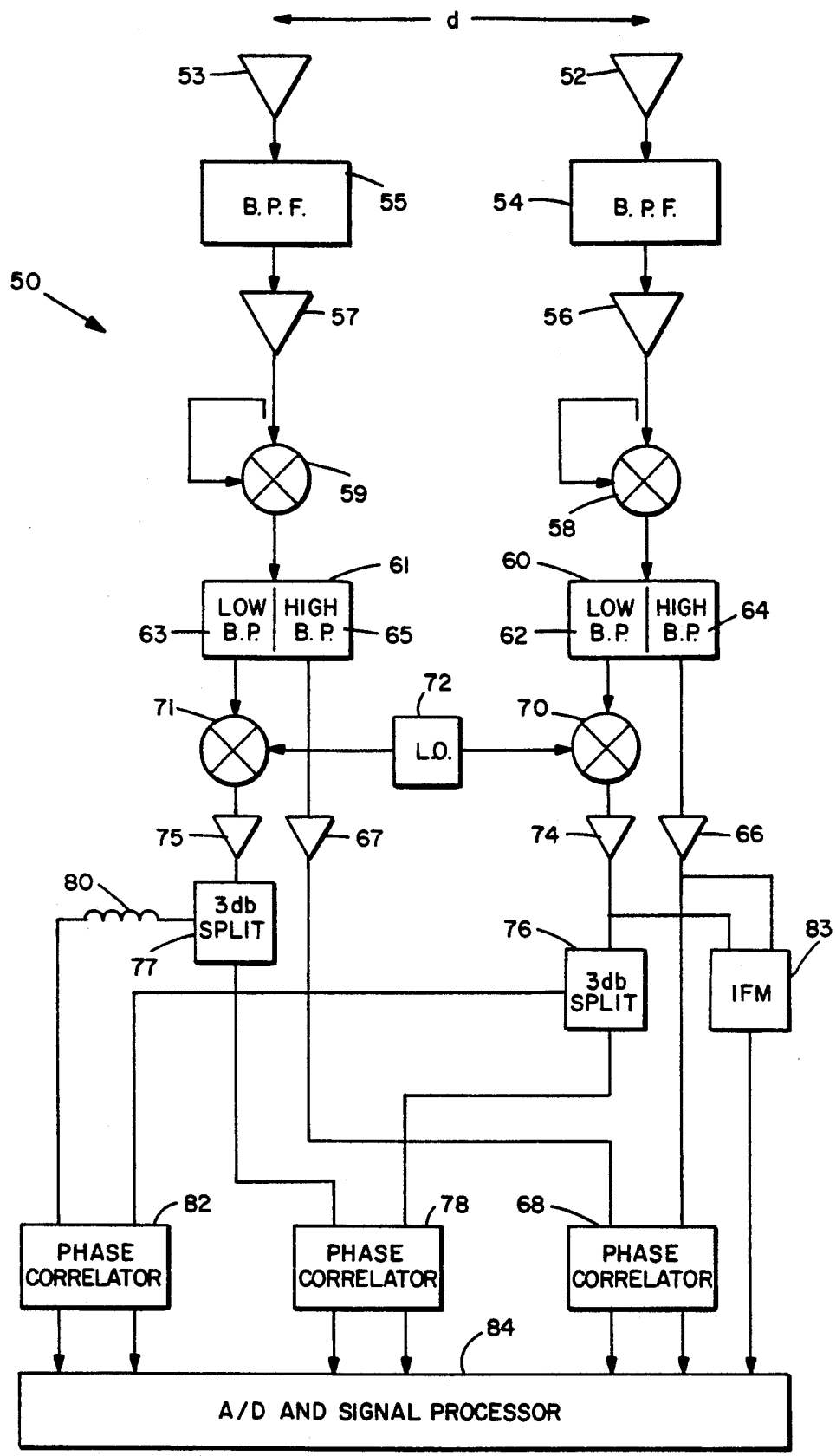
FIG. 2 is a schematic block diagram of an apparatus constructed in accordance with one embodiment of the present invention.

FIG. 2 shows an apparatus 50 which is capable of determining the angle of arrival of a pair of transmission signals being simultaneously received by an antenna pair 52,53. Signals received by the antenna pair 52,53 are coupled to respective, band pass filters 54,55 which limit the received signals to the intended frequency range of operation of the apparatus 50. The output signals of band pass filters 54,55 are coupled through amplifiers 56,57, respectively, to a pair of squarers 58,59. The outputs of squarers 58,59 are respectively coupled to a pair of diplexers or filters 60,61.

The diplexers 60,61 separate the squared signals into a pair of frequency band separated signals emanating respectively from band pass portions 62,63 and high pass portions 64,65. Signals from the high pass portions 64,65 are coupled through a respective pair of hard limiters 66,67 to a phase correlator 68. Signals from the band pass portions 62,63 are coupled to a respective pair of frequency converters 70,71 which serve to convert the frequencies of any signals therefrom to higher frequencies located in the high pass band of diplexer portions 64,65. This conversion is performed with the aid of a local oscillator 72 operating at the lower cutoff frequency of the high pass portions 64,65.

The output signals of converters 70,71 are respectively coupled through a pair of hard limiters 74,75 to a pair of signal splitters 76,77. Signal splitters 76,77 couple approximately one half of their respective input signals to a phase correlator 78. Signal splitter 77 couples the other approximate one half of its input signal through a delay line 80 to a third phase correlator 82, while signal splitter 76 couples the other approximate one half of its input signal directly to the third phase correlator 82.

The outputs of hard limiters 66,74 may optionally be coupled to an instantaneous frequency measurement (IFM) device 83, in the event that the system is intended for use with unknown frequencies. These measurements may be made in accordance with the copending patent application cited above entitled "Instantaneous Frequency Measurement Apparatus and Method", the contents of which are hereby incorporated by reference herein.

All of the hard limiters 66,67, 74,75 serve to both amplify and amplitude limit signals coupled to them for the purpose of conditioning these signals for the phase correlators 68,78,82 and the IFM 83 which devices function on the basis of phase.

Examples of the contemplated components and operational specifications for FIG. 2 are as follows:

| | |
|---|---|
| Band pass filters 54,55 | 2-4 GHz; |
| Squarers 58,59 | Double Balanced Mixers; |
| Middle band filters 62,63 | .03-2 GHz; |
| High band filters 64-65 | 4-8 GHz; |
| Local Oscillator 72 | 4 GHz; |
| Delay line 80 | .25 ns; and |
| Phase correlators 68,78,82 | 4-8 GHz. |

The outputs of phase correlators 68, 78 and 82 are coupled to analog to digital converters and computational circuitry located in a processor 84.

Phase correlator 68 produces a signal which is representative of the sum of the phase differences $\Delta\phi_1 + \Delta\phi_2$ of the received signals. Phase correlator 78 produces a signal which is representative of the absolute value of the difference or variation between the phase differences $|\Delta\phi_1 - \Delta\phi_2|$ of the received signals. Phase correlator 82 produces a signal, described below, which is representative of the relationship between the frequencies and phase differences determined for the received signals.

The respective phase differences $\phi_1, \phi_2$ may then be provided by the computational circuitry in processor 84 by halving the phase difference sum produced by correlator 68 to find the average phase difference and adding and subtracting one half of the phase difference variation produced by correlator 78 from that average.

This process is exemplified by the equation:

$$\phi_1 = \frac{\phi_1 + \phi_2}{2} + \frac{|\phi_1 - \phi_2|}{2} \quad (10)$$

The output of correlator 82 may then be used in combination with the known phase differences $\phi_1, \phi_2$ and previously determined frequencies of $w_1, w_2$ to produce the correct pairing of $w_1, \phi_1$ and $w_2, \phi_2$. These proper pairings are then used in equations 7A and 7B to calculate the respective angles of arrival $\theta_1, \theta_2$.

The basis for the determination of the phase differences $\phi_1, \phi_2$, the signal frequencies $w_1, w_2$ and the proper pairing thereof by the circuit of FIG. 2 is described below.

It can be shown that when an input signal of the form (neglecting relative phase terms)

$$x(t) = A_1 \cos(w_1 t) + A_2 \cos(w_2 t) \quad (11)$$

is input to a perfect squarer, the output of the squarer, $x^2(t)$, is of the form $$y(t) = x^2(t) = \quad (12)$$

$$\frac{|A_1|^2}{2} + \frac{|A_2|^2}{2} + \frac{|A_1|^2}{2} \cos(2w_1 t) + \frac{|A_2|^2}{2} \cos(2w_2 t) +$$

$$A_1 A_2 \cos(w_1 + w_2)t + A_1 A_2 \cos(w_1 - w_2)t$$

Note that there are two DC components, three high frequency components, and one medium frequency component. Using the band pass and high pass filtering of diplexers 60,61, we can separate y(t) into mid and high band components described by $$y_M(t) = A_1 A_2 \cos(w_1 - w_2)t \quad (13)$$

$$y_H(t) = \frac{|A_1|^2}{2} \cos(2w_1 t) + \frac{|A_2|^2}{2} \cos(2w_2 t) + \quad (14)$$

$$A_1 A_2 \cos(w_1 + w_2)t$$

The lower cutoff frequency of the band pass filter cannot be zero because it must be able to filter out the DC terms. This now puts a limit on the minimum frequency of $w_1 - w_2$ or how close the two frequencies can be. The lower cutoff frequency is set to at least one over the smallest pulse width. If the two signal powers are within (6) dB of each other, and assuming that we will hard limit both $y_M(t)$ and $y_H(t)$, then the sum term, $w_1 + w_2$, is dominant and equation (14) becomes $$y_H(t) = A_1 A_2 \cos(w_1 + w_2)t \quad (15)$$

Note from equation (13) that the difference information is always separable, independent of relative signal amplitudes, where from equation (14) the sum information is only attainable if the signal powers are within 6 dB. This is because either $2w_1$ or $2w_2$ components will be in the pass band along with the $(w_1 + w_2)$ component if the signal powers differ by more than 6 dB.

We now look at the expected output of a squarer with an input equal to that as described in equation (6a) and (6b). This is done physically by the squarers 58,59 at the outputs of the two antenna amplifiers 56,57.

For simplicity, we can rewrite equations (6a) and (6b) as $$x_1(t) = A_1 \cos(w_1 t) + A_2 \cos(w_2 t) \quad (19a)$$

$$x_2(t) = A_1 \cos(w_1 t - \Delta\phi_1) + A_2 \cos(w_2 t - \Delta\phi_2) \quad (19b)$$

Taking equation (19a) and (19b) through the squaring process, and separating the high pass and midband components on each, yields from antenna 52 at $y_1(t)$ $$y_{1M}(t) = A_1 A_2 \cos(w_1 - w_2)t \quad (20)$$

$$y_{1H}(t) = A_1 A_2 \cos(w_1 - w_2)t \quad (21)$$

and from the second antenna 53, at $y_2(t)$ $$Y_{2M}(t) = A_1 A_2 \cos(w_1 - w_2)t - (\Delta\phi_1 - \Delta\phi_2) \quad (22)$$

$$Y_{2H}(t) = A_1 A_2 \cos(w_1 - w_2)t - (\Delta\phi_1 - \Delta\phi_2) \quad (23)$$

If we take the high pass information and the midband information separately and perform a phase correlation between each, we can extract the phase difference between $y_{1M}$ and $y_{2M}$ to yield $|\Delta\phi_1 - \Delta\phi_2|$ and do the same with $y_{1H}$ and $y_{2H}$ to yield $|\Delta\phi_1 + \Delta\phi_2|$. Equation (10) and its $\Delta\phi_2$ equivalent are then used to solve for the individual phase components.

At this point, we can say that we have a method of solving for the individual phase components, $\Delta\phi_1$ and $\Delta\phi_2$, which are related to the individual angles of arrival, $\theta_1$ and $\theta_2$. We have shown also that the information produced by the squarers used in the phase measurement technique, can also be used to measure the individual frequencies of the two sources if these frequencies are not already known. There is, however, a problem when we try to use the measured parameters $\Delta\phi_1$, $\Delta\phi_2$, $w_1$, and $w_2$ to find $\theta_1$ and $\theta_2$ using equations (7a) and (7b). To see this we first solve equations (7a) and (7b) for $\theta_1$ and $\theta_2$ yielding $$\theta_1 = \operatorname{Sin}^{-1}\left[\frac{c\Delta\phi_1}{w_1 d}\right] \quad (24a)$$

$$\theta_2 = \operatorname{Sin}^{-1}\left[\frac{c\Delta\phi_2}{w_2 d}\right] \quad (24b)$$

One can see that, in order to solve for $\theta_1$ and $\theta_2$ properly, we need the information that will be plugged into equations (24a) and (24b) to be paired as $(\Delta\phi_1, w_1)$ and $(\Delta\phi_2, w_2)$.

Figure 3:
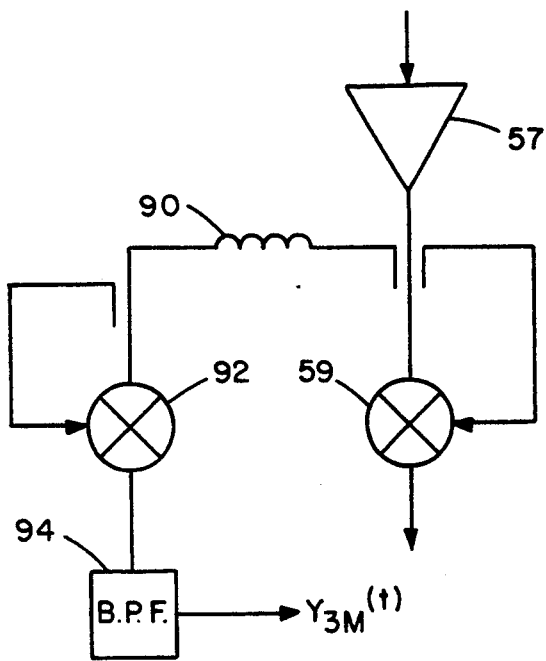
FIG. 3 is a modification of the diagram of FIG. 2 showing an alternate embodiment of the present invention.

One solution to this pairing problem is shown in FIG. 3 and includes adding a third channel of information, $y_3(t)$, tapped off the output of the second antenna 53, by means of a delay line 84 having a delay time $\gamma$, and a third squarer 86.

The high and midband information from $y_3(t)$ can be written as $$y_{3M}(t) = A_1 A_2 \cos[(w_1-w_2)t - (w_1-w_2)\gamma - (\Delta\phi_1-\Delta\phi_2)] \quad (25)$$

$$y_{3H}(t) = A_1 A_2 \cos[(w_1-w_2)t - (w_1-w_2)\gamma - (\Delta\phi_1-\Delta\phi_2)] \quad (26)$$

Taking the phase difference between $y_{3M}(t)$ and $y_{1M}(t)$, Eqn. (20), and between $y_{3H}(t)$ and $y_{1H}(t)$, Eqn. (21), will yield the phase information $$|(w_1-w_2)\gamma + (\Delta\phi_1-\Delta\phi_2)| \quad (27)$$

and $$|(w_1-w_2)\gamma + (\Delta\phi_1-\Delta\phi_2)| \quad (28)$$

Eqn. (27) provides information which is dependent on the pairing of $w_1$ and $w_2$ with $\Delta\phi_1$ and $\Delta\phi_2$. In fact, the phase information given by equation (28) is not needed because its value is independent of the pairing of the individual parameters. By noting that mathematically $y_{3M}(t)$ is equal to $y_{2M}(t-\gamma)$, we can eliminate the third squarer by simply placing the delay line 80 to receive the $y_{2M}(t)$ signal from squarer 59 as shown in FIG. 2.

There are now five channels of information, $y_{1M}(t)$, $y_{1H}(t)$, $y_{2M}(t)$, $y_{2H}(t)$, and $y_{3M}(t)$, to be used in the intermodulation technique for measuring the angles of arrival of two simultaneous signals.

In this manner, the three phase correlators 68, 78, 82 of FIG. 2 may be used to yield the needed phase information to solve for $\phi_1$ and $\phi_2$. This is assuming that we have prior knowledge of the two frequencies, $w_1$ and $w_2$. The outputs of correlators 68, 78 and 82 are, respectively $$|\Delta\phi_1-\Delta\phi_2| \quad (29a)$$

$$\Delta\phi_1+\Delta\phi_2 \quad (29b)$$

$$|(w_1-w_2)\gamma+\Delta\phi_1-\Delta\phi_2| \quad (29c)$$

Once the above information is measured, values from correlators 68 and 78 values are plugged into equation (10) and its $\phi_2$ equivalent to yield $\Delta\phi_1$ and $\Delta\phi_2$ separately. If the two frequencies are not known, $y_{1M}(t)$ and $y_{1H}(t)$ as described by equations (20) and (21) respectively, can be measured with an IFM (Instantaneous Frequency Measurement) device to find the values of $w_1-w_2$ and $w_1+w_2$. These two values are then used by finding the average and adding and subtracting therefrom one half of the difference in a manner similar to $\Delta\phi_1$ and $\Delta\phi_2$ to find $w_1$ and $w_2$. The last step is to find what pairing of $\phi$ and $w$, when plugged into (29c), equals correlator 82 output. When this is done, it is known which frequency has which phase angle.

A design constraint is placed upon the phase correlators because they can measure the phase difference between two inputs unambiguously, provided that the phase difference does not exceed $2\pi$ radians. Thus, the input phase difference limit on correlators 68, 78 and 82 are $$|\Delta\phi_1-\Delta\phi_2| < 2\pi \quad (30a)$$

$$-\pi < \Delta\phi_1+\Delta\phi_2 < \pi \quad (30b)$$

$$|(w_1-w_2)\gamma+\Delta\phi_1-\Delta\phi_2| < 2\pi \quad (30c)$$

It is obvious from equation (30b) above that limitations on the individual phase components are $$\frac{\pi}{2} < \Delta\phi_1 < \frac{\pi}{2} \quad (31a)$$

$$\frac{\pi}{2} < \Delta\phi_2 < \frac{\pi}{2} \quad (31b)$$

This automatically relimits equation (30a) to be $$\Delta\phi_1-\Delta\phi_2 < \pi \quad (32)$$

To find what value or $r$ in equation (30c) allows a maximum phase swing for correlator 82, we first set $\Delta\phi_1-\Delta\phi_2$ to its maximum of $\pi$, and equate $$|(w_1-w_2)\gamma+\pi| = 2\pi \quad (33)$$

If we assume an octave bandwidth operation, then the largest difference there can be between $w_1$ and $w_2$ is $2\pi(2f_c/3)$ where $f_c$ is the center band frequency. We then find the value of $\gamma$ by the equation $$2\pi\left(\frac{2}{3}f_c\right)\gamma = \pi \quad (34)$$

or $$\gamma = 3/4f_c \quad (35)$$

For a more specific example, assume an operational bandwidth between 2 and 4 GHz (Gigahertz) where $f_c$ is 3 GHz. This results in a delay-line value $\gamma$ of 0.25 ns. The limitations on the individual phase terms described in equation (31a) and (31b) automatically limit the unambiguous angle coverage according to equation (7a) and (7b) or equation (24a) and (24b) yielding $$|\Delta\phi_1| = \left|\frac{w_1 d}{c}\operatorname{Sin}\theta_1\right| \leq \frac{\pi}{2} \quad (36)$$

$$|\Delta\phi_2| = \left|\frac{w_2 d}{c} \sin\theta_2\right| \leq \frac{\pi}{2} \tag{37}$$

If we define the antenna spacing, d, in terms of a fraction, k, of the center band wavelength, we can write $$\left|2\pi \frac{f}{f_c} k\sin O\right| < \frac{\pi}{2} \tag{38}$$

For octave bandwidth operations, (f/f$_c$) varies between ⅔ and 4/3. For the purpose of finding the limits on angle, θ, we choose the highest and lowest f/f$_c$ to yield $$\left|\frac{8}{3} k\sin\theta\right| \leq \frac{1}{2} \tag{39}$$

$$\left|\frac{4}{3} k\sin\theta\right| \leq \frac{1}{2} \tag{40}$$

or $$|k\sin\theta| < \frac{3}{16} \tag{41}$$

$$|k\sin\theta| < \frac{3}{8} \tag{42}$$

If k is chosen to be (0.5), then the maximum unambiguous angle coverage for a source at the highest frequency is (±22) degrees from boresite and for the lowest frequency is (±48.6) degrees. If k is chosen to be (0.375), then the angles of coverage are (±30) degrees for the highest and (±90) degrees for the lowest frequency.

FIG. 3 shows a modification to the apparatus of FIG. 2, the newly identified components of which are intended to take the place of delay line 80 in FIG. 2. In the modification, the signal from amplifier 57 is additionally coupled through a delay line 90 to an additional squarer 92. As with the previous squarers 58,59, both inputs are coupled to receive a portion of the same signal. The output of squarer 92 is coupled through a middle band pass filter 94 to produce the delayed middle band signals constituting Y$_{3M}$(t) which is then coupled to the phase correlator 82 in the same manner as delay line 80.

This embodiment is simply an alternate way of providing delayed middle frequency band signals filtered from the squared transmission signals. Although this variation of the apparatus is more extensive due to the additional components, the present invention is intended to cover both embodiments.

The embodiments described above are intended to be taken in an illustrative and not a limiting sense. Various modifications and changes may be made to the above embodiments by persons skilled in the art without departing from the scope of the present invention as defined in the appended claims.

What is claimed is:

1. An apparatus for measuring the angles of arrival of a pair of transmission signals relative to a fixed antenna pair simultaneously receiving the transmission signals based upon the phase difference between antennas for each signal and the frequencies thereof, comprising:

means for separately squaring the signals received by each antenna;

means for filtering each squared signal for separating a high frequency band and a middle frequency band;

first means for phase correlating high frequency band signals filtered from each squared signal for producing a sum signal of the phase differences between the antennas for received transmission signals;

second means for phase correlating middle frequency band signals filtered from each squared signal for producing a difference signal for the phase differences of the transmission signals received by the antenna pair;

means for determining the phase differences of the transmission signals received by the antenna pair from the sum and difference signals therefor;

means for providing delayed middle frequency band of signals filtered from a squared signal from one of the antennas;

third means for phase correlating the delayed middle frequency band signals from the one of the antennas with the middle frequency band signals of the other of the antennas from the means for filtering each squared signal, for producing a correspondence signal related to the correspondence between the frequencies and the determined phase differences; and means for computing the angles of arrival of the pair of transmission signals using the phase differences from the means for determining, the frequencies of the transmission signals and the correspondence signal from the third means for phase correlating.

2. The apparatus of claim 1, further comprising means for determining the frequencies of the transmission signals including means for measuring instantaneous frequencies of the high and middle frequency band signals of one of the squared signals.

3. The apparatus of claim 2, wherein the means for determining phase differences includes means for determining the average and the difference for the measured phase differences and means for adding and subtracting half of the difference to the average for determining the phase differences of the transmission signals.

4. The apparatus of claim 3, wherein the means for determining frequencies further includes means for determining the average and the difference for the measured instantaneous frequencies and means for adding and subtracting half of the difference to the average for determining the frequencies of the transmission signals.

5. The apparatus of claim 4, wherein the means for providing a delayed middle frequency band of signals includes means for coupling a portion of the received signals from the one of the antennas through a delay means, a second means for squaring delayed signals from the delay means, and a second means for filtering squared signals from the delay means for separating the delayed middle frequency band of signals.

6. The apparatus of claim 4, wherein the means for providing a delayed middle frequency band of signals includes means for delaying middle frequency band signals separated by the first said means for filtering for the one of the antennas.

7. The apparatus of claim 6, further comprising means for limiting signals coupled to the means for determining frequencies and the first, second and third means for phase correlating.

8. The apparatus of claim 7, further comprising means for splitting the middle frequency band signals from each of the squared signals between the second and third means for phase correlating.

9. The apparatus of claim 8, further comprising means for converting the middle frequency band signals from the means for filtering to higher frequency bands prior to phase correlation by the second and third means for phase correlating.

10. A method for measuring the angles of arrival of a pair of transmission signals relative to a fixed antenna pair simultaneously receiving the transmission signals based upon the phase difference between antennas for each signal and the frequencies thereof, comprising the steps of:

separately squaring the signals received by each antenna;

filtering each squared signal for separating a high frequency band and a middle frequency band;

first phase correlating high frequency band signals filtered from each squared signal for producing a sum signal of the phase differences between the antennas for received transmission signals;

second phase correlating middle frequency band signals filtered from each squared signal for producing a difference signal for the phase differences of the transmission signals received by the antenna pair;

determining the phase differences of the transmission signals received by the antenna pair from the sum and difference signals therefor;

providing delayed middle frequency band signals filtered from a squared signal from one of the antennas;

third phase correlating the delayed middle frequency band signals from the one of the antennas with the middle frequency band signals of the other of the antennas for producing a correspondence signal related to the correspondence between the frequencies and the determined phase differences; and computing the angles of arrival of the pair of transmission signals using the determined phase differences, the frequencies and the correspondence signal.

11. The method of claim 10, further comprising determining the frequencies of the transmission signals including measuring instantaneous frequencies of the high and middle frequency band signals of one of the squared signals.

12. The method of claim 11, wherein the step of determining phase differences includes determining the average and the difference for the measured phase differences and adding and subtracting half of the difference to the average for determining the phase differences of the transmission signals.

13. The method of claim 10, wherein the step of determining frequencies further includes determining the average and the difference for the measured instantaneous frequencies and adding and subtracting half of the difference to the average for determining the frequencies of the transmission signals.

14. The method of claim 13, wherein the step of providing a delayed middle frequency band of signals includes coupling a portion of the received signals from the one of the antennas through a delay means, squaring delayed signals from the delay means, and filtering squared signals from the delay means for separating the delayed middle frequency band of signals.

15. The method of claim 13, wherein the step of providing a delayed middle frequency band of signals includes delaying middle frequency band signals separated by the filtering step for the one of the antennas.

16. The method of claim 15, further comprising limiting signals coupled to the step of determining frequencies and the first, second and third steps of phase correlating.

17. The method of claim 16, further comprising splitting the middle frequency band signals filtered from each of the squared signals between the second and third steps of phase correlating.

18. The method of claim 17, further comprising converting the filtered middle frequency band signals to higher frequency bands prior to phase correlation by the second and third steps of phase correlating.

* * * * *